Patented Jan. 6, 1948                                                                 2,434,149

UNITED STATES PATENT OFFICE 2,434,149

OPTICAL GLASS

Paul F. De Paolis, Rochester, N. Y., assignor to Eastman Kodak Company, Rochester, N. Y., a corporation of New Jersey No Drawing. Application August 4, 1945, Serial No. 609,025

5 Claims. (Cl. 106—54)

This invention relates to glass having optical values in a range useful in the design of optical instruments. Specifically, this application relates to such glass having an index of refraction for the D line ($n_D$) between 1.80 and 1.82 and an Abbe value ($\nu$) between 40 and 42. In general, these glasses are of the non-silicate type covered generically by Reissue Patent No. 21,175, Morey, and Patent No. 2,206,081, Eberlin, over which they are improvements.

While the Morey patent disclosed the wide field within which useful glasses might be found, this field is not of uniform productiveness. The various oxides cannot be combined in all proportions to obtain equally useful glasses; nor are they all compatible in all proportions to make a glass without tendency to crystallize or devitrify. This application relates to a particular area of that field that has been found to have definite utility in the designing of lenses and optical instruments.

The glasses herein described, besides having valuable optical properties and having high transparency, stability, and hardness, are unusually resistant to the action of the atmosphere and to corrosive liquids such as halogenated hydrocarbons, sulfur, and iodides, and hence are especially valuable for use in refractometers.

The examples herein differ from those in the patents mentioned which they most closely resemble in that the total amounts of the oxides of lanthanum, tantalum, and thorium, all of which are present, constitute less than 70 per cent by weight of the glass, and that there are included oxides of zirconium, titanium, and/or tungsten, bringing the oxides of rare earth up to from 64 to 73 per cent, and in that in addition to boric acid which is present as the principal glassifier, small amounts of silica or aluminum oxide, totaling from 3 to 7 per cent, are used.

Formulas illustrative of my invention follow, parts being by weight, certain optical data also being given. It is understood that, as is customary in glass making, the ingredients may not be introduced as oxides, but will be reduced in the furnace. The optical values will vary with variation in the proportions within the ranges given in the accompanying claims.

|  | Example 1 | Example 2 | Example 3 | Example 4 |
|---|---|---|---|---|
| Lanthanum oxide | 26 | 27 | 40 | 32 |
| Tantalum oxide | 15 | 16 | 13 | 15 |
| Thorium oxide | 18 | 16 | 5 | 20 |
| Tungsten oxide | 12 | 2 | | |
| Zirconium oxide | | 12 | 2 | 2 |
| Titanium oxide | | | 4 | |
| Barium oxide | 2 | | 2.5 | 2 |
| Strontium oxide | | | 4 | |
| Boric oxide | 22 | 24 | 22.8 | 23 |
| Silicon oxide | 5 | | 2.5 | 5 |
| Aluminum oxide | | 3 | 4 | 1 |
| Lithium oxide | | | 0.2 | |
| $n_D$ | 1.8055 | 1.8042 | 1.8036 | 1.815 |
| $\nu$ | 40.3 | 40.4 | 41.5 | 41.7 |

In the examples given, although the parts are precisely given and these are preferred, it is to be understood that variations in these proportions and addition of other oxides in small quantities are contemplated, provided these changes are within the ranges and the resulting proportions are of the order of those given in the claims. Such changes will naturally result in variations in the optical properties. All such modifications and equivalents I consider as within the scope of my invention.

When in the claims I use the expression "oxide selected from the group," I do not mean necessarily a single oxide, but mean one or more oxides.

Having thus described my invention, what I claim is:

1. An optical glass comprising the following oxides in the proportions by weight as given: oxide selected from the group consisting of the oxides of boron, aluminum, and silicon, from 27 to 30 parts, of which boric oxide comprises from 22 to 24 parts; lanthanum, tantalum, and thorium oxides totaling less than 70 parts, at least 5 parts of each being present; and oxide selected from the group consisting of the oxides of tungsten, zirconium, and titanium totaling from 2 to 15 parts.

2. An optical glass having an $n_D$ value between 1.80 and 1.82 and an Abbe value between 40 and 42 and comprising in the proportions by weight as given: oxide selected from the group consisting of the oxides of boron, aluminum, and silicon, from 27 to 30 parts, of which boric oxide comprises from 22 to 24 parts; lanthanum, tantalum, and thorium oxides totaling from 58 to 67 parts, of which lanthanum oxide comprises 25 to 40 parts; tantalum oxide, 13 to 16 parts; and thorium oxide, 5 to 20 parts; and oxide selected from the group consisting of the oxides of tungsten, zirconium, and titanium totaling from 2 to 15 parts.

3. An optical glass having an $n_D$ value between 1.80 and 1.81 and an Abbe value between 40 and 42 and comprising in the proportions by weight as given: oxide selected from the group consisting of the oxides of boron, aluminum, and silicon, from 27 to 30 parts, of which boric oxide comprises from 22 to 24 parts; lanthanum, tantalum, and thorium oxides totaling less than 60 parts, of which lanthanum oxide comprises 25 to 40 parts; tantalum oxide, 13 to 16 parts; and thorium oxide, 5 to 18 parts; and oxide selected from the group consisting of the oxides of tungsten, zirconium, and titanium totaling from 4 to 15 parts.

4. An optical glass having an $n_D$ value of the order of 1.80 and an Abbe value of the order of 41.5 and comprising the following oxides in proportions by weight of the order given: lanthanum oxide, 40 parts; tantalum oxide, 13 to 16 parts; thorium oxide, 5 parts; titanium oxide, 4 parts; zirconium oxide, 2 parts; barium and strontium oxides totaling 6 to 7 parts; boric oxide, 22 to 24 parts; silicon and aluminum oxides totaling 6 to 7 parts.

5. An optical glass having an $n_D$ value between 1.80 and 1.81 and an Abbe value between 40.0 and 40.5 and comprising the following oxides in proportions by weight of the order given: lanthanum oxide, 25 to 28 parts; tantalum oxide, 14 to 17 parts; thorium oxide, 15 to 20 parts; tungsten oxide, 0 to 12 parts; zirconium oxide, 0 to 12 parts; the oxides of tungsten and zirconium together totaling not over 15 parts; oxide selected from the group consisting of the oxides of boron, silicon, and aluminum totaling 25 to 30 parts, of which boric acid constitutes 22 to 24 parts.

PAUL F. DE PAOLIS.

REFERENCES CITED

The following references are of record in the file of this patent:

UNITED STATES PATENTS

| Number | Name | Date |
|---|---|---|
| Re. 21,175 | Morey | Aug. 15, 1939 |
| 2,241,249 | Eberlin et al. | May 6, 1941 |